United States Patent [19]
Herrmann

[11] Patent Number: 5,678,240
[45] Date of Patent: Oct. 14, 1997

[54] SODIUM TO SODIUM CARBONATE CONVERSION PROCESS

[75] Inventor: Steven D. Herrmann, Idaho Falls, Id.

[73] Assignee: The United States of America as represented by the United States Department of Energy, Washington, D.C.

[21] Appl. No.: 670,134

[22] Filed: Jun. 25, 1996

[51] Int. Cl.⁶ ........................................ G21F 9/00
[52] U.S. Cl. .................. 588/18; 423/189; 423/246; 423/421
[58] Field of Search .................. 588/18; 423/421, 423/189, 246

[56] References Cited

U.S. PATENT DOCUMENTS

| | | |
|---|---|---|
| 3,773,902 | 11/1973 | Neumann . |
| 3,819,813 | 6/1974 | Jones, Jr. et al. . |
| 3,842,157 | 10/1974 | Neumann . |
| 3,975,503 | 8/1976 | Hauschild et al. ............ 423/421 |
| 4,895,678 | 1/1990 | Ohtsuka et al. ............ 252/632 |
| 5,348,689 | 9/1994 | Gay et al. ............ 588/18 |

OTHER PUBLICATIONS

Herrmann et al., "Elemental Sodium to Sodium Carbonate Conversion at Argonne National Laboratory" Presentation at American Nuclear Society Meeting Jun. 25 thru 29th, 1995, 7 pages.

*Primary Examiner*—Ngoclan Mai
*Attorney, Agent, or Firm*—Mark LaMarre; Thomas G. Anderson; William R. Moser

[57] ABSTRACT

A method of converting radioactive alkali metal into a low level disposable solid waste material. The radioactive alkali metal is atomized and introduced into an aqueous caustic solution having caustic present in the range of from about 20 wt % to about 70 wt % to convert the radioactive alkali metal to a radioactive alkali metal hydroxide. The aqueous caustic containing radioactive alkali metal hydroxide and $CO_2$ are introduced into a thin film evaporator with the $CO_2$ present in an amount greater than required to convert the alkali metal hydroxide to a radioactive alkali metal carbonate, and thereafter the radioactive alkali metal carbonate is separated from the thin film evaporator as a dry powder. Hydroxide solutions containing toxic metal hydroxide including one or more metal ions of Sb, As, Ba, Be, Cd, Cr, Pb, Hg, Ni, Se, Ag and Tl can be converted into a low level non-hazardous waste using the thin film evaporator of the invention.

19 Claims, 3 Drawing Sheets

SODIUM TO SODIUM CARBONATE CONVERSION PROCESS

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

BACKGROUND OF THE INVENTION

Breeder reactors of the type constructed experimentally at Argonne National Laboratory and the Detroit Edison Fermi Reactor use alkali metals as the coolant for the reactor. Usually the alkali metal is sodium or a combination of sodium and potassium, preferably the eutectic thereof. After use, quantities of elemental sodium or the sodium and potassium eutectic (NaK) must be disposed of in a safe and efficacious manner. Presently, Argonne has about 175,000 gallons of sodium which comes from 70,000 gallons from Detroit Edison Fermi Reactor and 105,000 gallons from Argonne's Experimental Breeder Reactor (EBR-II).

One method suggested for treating the sodium or NAK from breeder reactors is to convert the alkali metal to the alkali metal hydroxide. However, because there is no current beneficial use for the caustic produced, this is not a satisfactory solution. This is true because the Environmental Protection Agency (EPA) considers caustic a "mixed" waste due to its hazardous characteristics of corrosivity and radioactive content. Since mixed waste is not suitable for final disposal, something other than conversion to caustic has to be done with the alkali metal presently in possession of Argonne National Laboratory. Converting the alkali metal to a caustic solution and thereafter to a carbonate will permit disposal of the carbonate as a low level radioactive waste.

This invention relates to a two-stage process for converting alkali metals to the associated carbonate which may be land disposed as a non-hazardous and low-level radioactive waste. A hydroxide solution is produced from the alkali metal in the first stage which is then converted to the corresponding carbonate by contact with a carbon dioxide or a carbon dioxide blanket in a thin film evaporator. The thin film evaporator useful in the present invention includes separate reaction and evaporator zones. The thin film evaporator may also be used to dispose of hydroxide solutions containing other hazardous constituents such as toxic metals.

SUMMARY OF THE INVENTION

Accordingly, a principal object of the present invention is to convert radioactive alkali metal into low level radioactive carbonate waste.

Yet another object of the invention is to inject liquid alkali metal into a aqueous caustic solution thereby controlling the rate of reaction and heat of reaction while preventing hazardous conditions during reaction of the alkali metal to the hydroxide.

Still another object of the present invention is to provide a method of converting radioactive alkali metal into a caustic solution suitable for conversion to a carbonate in which the only material vented to the atmosphere is hydrogen gas free of radioactive particulates.

Still another object of the invention is to convert a caustic solution into a readily stored and disposable alkali metal carbonate solid by use of a thin film evaporator incorporating separate reactor and evaporator zones.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE PREFERRED EMBODIMENT

Figure 1:
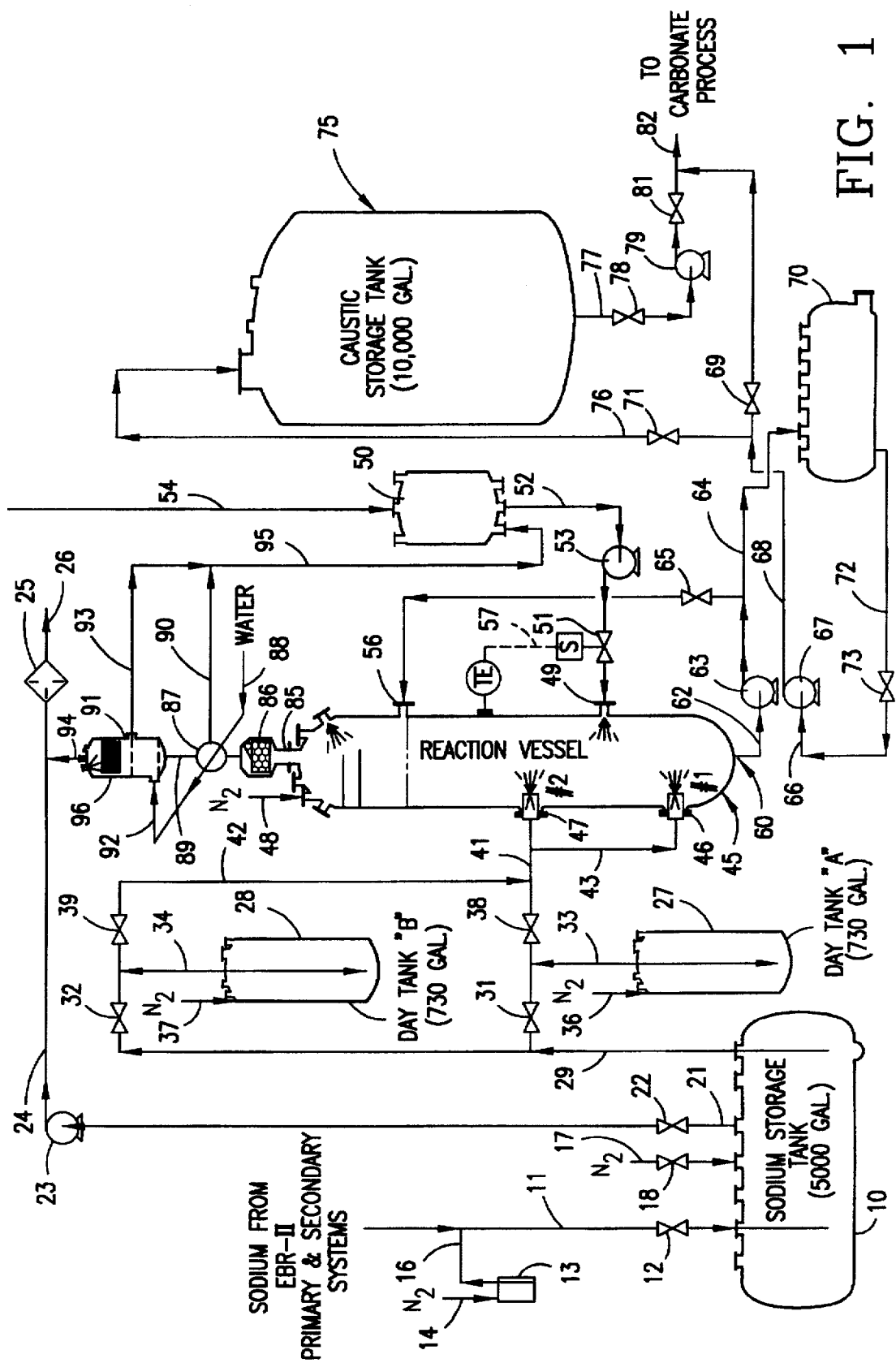
FIG. 1 is a flow diagram of the caustic process of the present invention showing the conversion of alkali metal into the corresponding hydroxide solution.

In an overview of the inventive process, sodium will be used for purposes for explanation but is not intended to be a limitation of the invention. The process is designed to accommodate various alkali metals, mixtures and alloys which may be useful. Specifically and for purposes of illustration only, in the caustic process, liquid sodium is injected preferably at a rate of 30 gallons per hour into a 50 weight percent caustic solution where it exothermically reacts with water to form sodium hydroxide and hydrogen gas by the reaction:

$$Na+H_2O \rightarrow NaOH + \tfrac{1}{2}H_2$$

The process begins by accumulating molten sodium maintained liquid at a temperature of about 250° F. in a storage tank 10 from a 55 gallon storage drum 13 or from a source such as the EBR-II primary or secondary system. From the storage tank 10, molten sodium is transferred to day tanks 27 and 28 and then injected into the reaction vessel 45 to react with water in a caustic medium. Hot caustic solution is directed to a cooling tank 70 after which it is directed to the carbonate process or to a caustic storage tank 75. Hydrogen is vented to the atmosphere through an off gas system to be described later to remove radioactive particulate material.

Because sodium reacts violently with water, the caustic process is designed to provide controlled and continuous sodium/water reaction. A controlled reaction is accomplished by injecting sodium into a caustic solution that is 20-70 weight percent caustic, preferably 50 weight percent caustic while maintaining a nitrogen atmosphere in the reaction vessel 45 to exclude oxygen. By injecting sodium into a 50 weight percent caustic rather than pure water, both the reaction rate and the heat generated by the exothermic reaction are reduced and controlled. Exclusion of oxygen in the reactor vessel 45 precludes any potentially explosive reaction with hydrogen.

A specially designed nozzle 100 is used to introduce steam, nitrogen, or a combination of both at the point of injection to atomize sodium, thereby reducing nozzle plugging due to the formation of sodium oxide and enhancing the surface area of the sodium particles being injected to the sodium vessel 45. Because liquid sodium is lighter than the caustic in the reaction vessel 45, it is important to increase the surface area of the incoming alkali metal material in order to enhance the reaction and prevent the sodium from pooling at the top of the liquid level in the reaction vessel 45. The process control system is preferably designed to maintain a 50 weight percent caustic solution in the reaction vessel which is accomplished by controlled addition of water from a water holding tank 50 to maintain the reaction vessel temperature at or near the solution's atmospheric boiling point which is about 290° F. for a 50 weight percent caustic solution.

In the carbonate process, the conversion of sodium hydroxide to sodium carbonate is governed by the reaction:

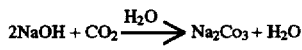

$$2NaOH + CO_2 \xrightarrow{H_2O} Na_2Co_3 + H_2O$$

The caustic solution generally maintained at a temperature in the range of from about 60° to about 290° F. is fed into a horizontal thin film evaporator 125, in the presence of a carbon dioxide atmosphere. In the evaporator 125 the sodium hydroxide is converted to sodium carbonate and excess water is evaporated, recovered and reused in the caustic process. The sodium carbonate is expelled from the evaporator 125 as a dry powder and deposited in 55 gallon drums 170 and 175 for disposal.

More specifically, the process will now be described in detail.

Referring to FIG. 1, the caustic process is illustrated. The sodium storage tank 10 receives sodium from the EBR II primary and secondary systems through an inlet line 11 controlled by a valve 12. Alternately, sodium may be introduced into the tank 10 from a sodium storage drum 13 by drawing a vacuum on the tank 10 via a vacuum pump 23. Nitrogen from a source thereof is introduced through a line 14 into the drum 13 and then sodium exits the drum through a line 16 into inlet line 11. The sodium in the sodium storage tank 10 is maintained under a nitrogen atmosphere via a line 17 from a source of nitrogen and a valve 18 in order to preclude the presence of air which could result in an explosive reaction. Off gases from the sodium storage tank 10 exit through an overhead line 21 and a valve 22 to a vacuum pump 23 and line 24 which passes through a HEPA filter 25 and then are discharged through line 26 to the atmosphere.

The sodium metal in the tank 10 is transferred via a line 29 to day tanks 27 and 28. A valve 31 controls the flow of sodium from the sodium storage tank 10 into the day tank 27 via line 33 and a valve 32 controls the flow of sodium from the tank 10 into the day tank 28 through a line 34. In both day tanks 27 and 28 nitrogen atmospheres are maintained respectively by nitrogen inlet lines 36 and 37. Accordingly, it is seen that the liquid alkali metal whether it is stored in tank 10, 27, or 28 is always protected by an inert atmosphere to prevent the presence of air which could lead to an explosive reaction. Outlet valves 38 and 39, respectively, control the sodium flow from day tanks 27 and 28 to inlet lines 41 and 42 from day tanks 27 and 28 into the reaction vessel 45. The sodium is introduced into the reaction vessel 45 through two nozzle housings 46 and 47 which accommodate the nozzles 100, hereinafter to be described. The two nozzle housings 46 and 47 are connected by line 43. The reaction vessel 45 is also protected by a nitrogen atmosphere which is introduced into the reaction vessel 45 through a line 48. Water is introduced into the reaction vessel 45 through a fixture 49 which is controlled by a valve 51 in a line from the water holding tank 50, the valve 51 being connected to an outlet line 52 from the tank 50 and a pump 53 which is used to control the volume of water admitted into the reaction vessel 45.

A control circuit 57 senses the weight percent of caustic in the reaction vessel 45 and controls the valve 51 and the pump 53 to add more or less water as needed to maintain the caustic solution at the desired level in the 20–70 weight percent range. The water holding tank 50 is connected to a distillate holding tank 180 in the carbonate process via line 54.

An inlet 56 is used to recirculate caustic which is removed from the reaction vessel 45 through the caustic outlet 60 and is transmitted to the caustic cooling tank 70 via a line 62, a pump 63 and a line 64. A portion of caustic may be recirculated to reaction vessel 45 through valve 65 and inlet 56 which controls the amount of caustic being reintroduced into the reaction vessel 45 through inlet 56. Caustic from the cooling tank 70 can be transmitted through line 72 and valve 73 to pump 67 via line 66 to be transmitted via line 68 and valve 69 to the carbonate process inlet line 82. A portion of the caustic in line 68 may flow through valve 71 and line 76 into the caustic storage tank 75. As seen, caustic from the caustic cooling tank 70 passes through line 72 and valve 73 into line 66 as needed to control temperature of caustic transmitted to the carbonate process. It is seen that the caustic can be routed from the caustic cooling tank 70 either to the carbonate process 82 or as a recycle stream into the reaction vessel 45, all as required to maintain the process parameters. From the caustic storage tank 75, caustic can be withdrawn through outlet 77 and valve 78 by a pump 79 and controlled by a valve 81 and introduced into the carbonate process through feed line 82.

From the reaction vessel 45, hydrogen which is produced during the reaction as previously discussed, leaves the reaction vessel through an overhead outlet 85 and passes through a demister 86 into a condenser 87. Cooling water 88 is introduced into the condenser as is well known and leaves through an outlet 92 and is introduced into a scrubber 91. The scrubber 91 has an outlet 93 which recirculates water through line 95 to the water holding tank 50 and also collects water from the condenser 87 from a line 90 which also leads to the water holding tank. The overhead vapors pass from a line 89 through outlet 94 after passing through a demister 96 in the scrubber 91. The cleansed gasses pass through the HEPA filter 25 previously discussed, which removes any radioactive particles present from the sodium storage tank 10 or from the reactor vessel 45 and then the gas is exhausted to the atmosphere, through line 26, all as previously discussed.

Figure 2:
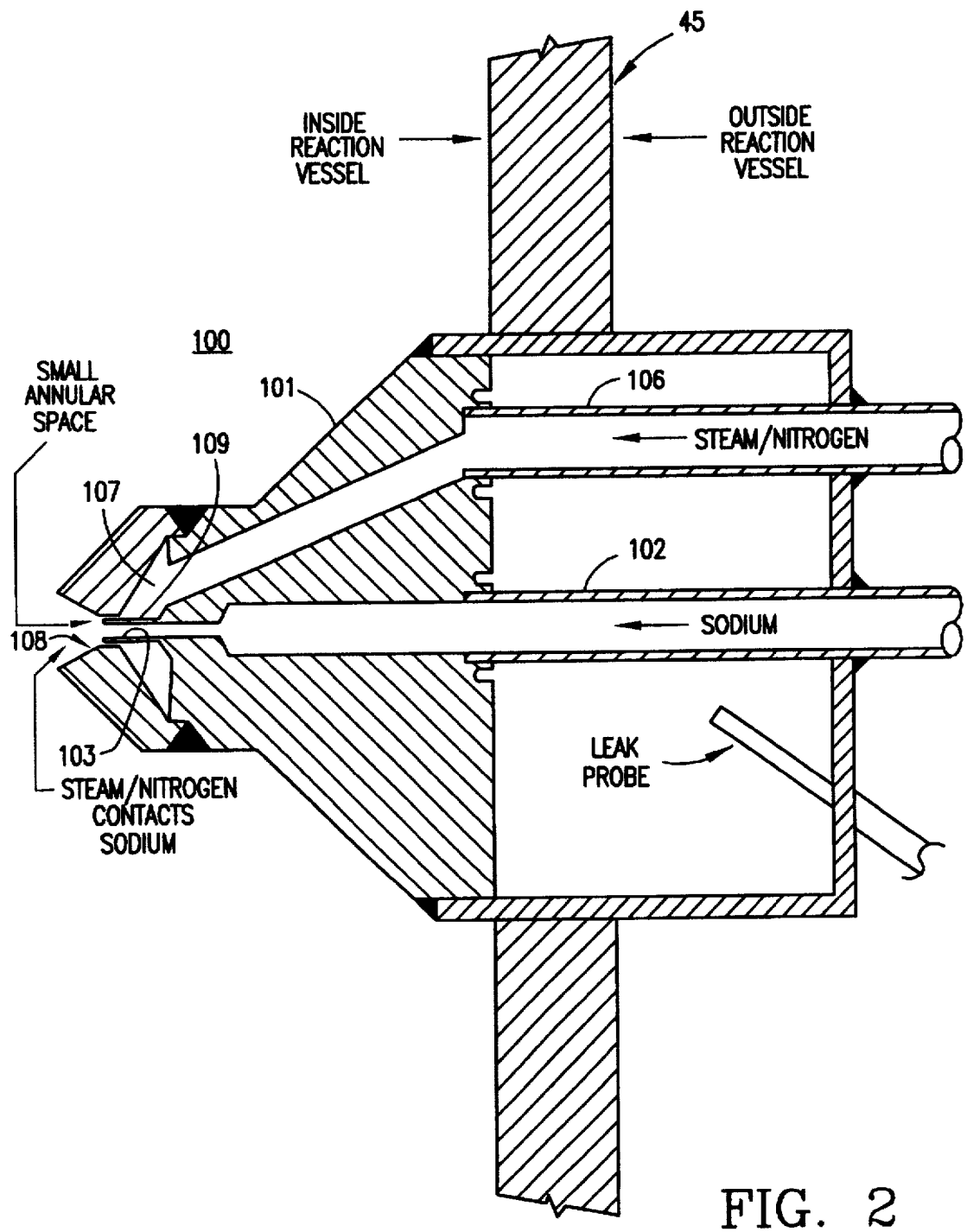
FIG. 2 is an enlarged elevation view in cross section of the injector nozzles used to inject the alkali metal as an alkali metal in atomized form into a caustic solution.

Referring now to FIG. 2, there is disclosed a sectioned view of the nozzle 100 which is particularly useful in the present invention. The nozzle 100 includes a body portion 101 connected to a sodium line 102 which leads into the body portion 101 and exits the body portion 101 through a reduced diameter nozzle or outlet 103. A combination steam and nitrogen line 106 opens via an internal opening in the body 101 into a plenum 107 surrounding the sodium outlet 103, the plenum 107 forming a small annulus 109 at the nozzle outlet or orifice 108. The outer wall of the body 101 at the nozzle orifice 108 is angularly disposed with respect to the central axis of the nozzle 100 by about 10°–20°. The flow of steam and/or nitrogen through the plenum 107 and the annular space 109 causes the sodium in line 102 to be atomized, thereby to finely divide the sodium metal as it enters the reaction vessel 45 to provide sufficient surface area for the sodium to react with the caustic in the vessel 45.

Figure 3:
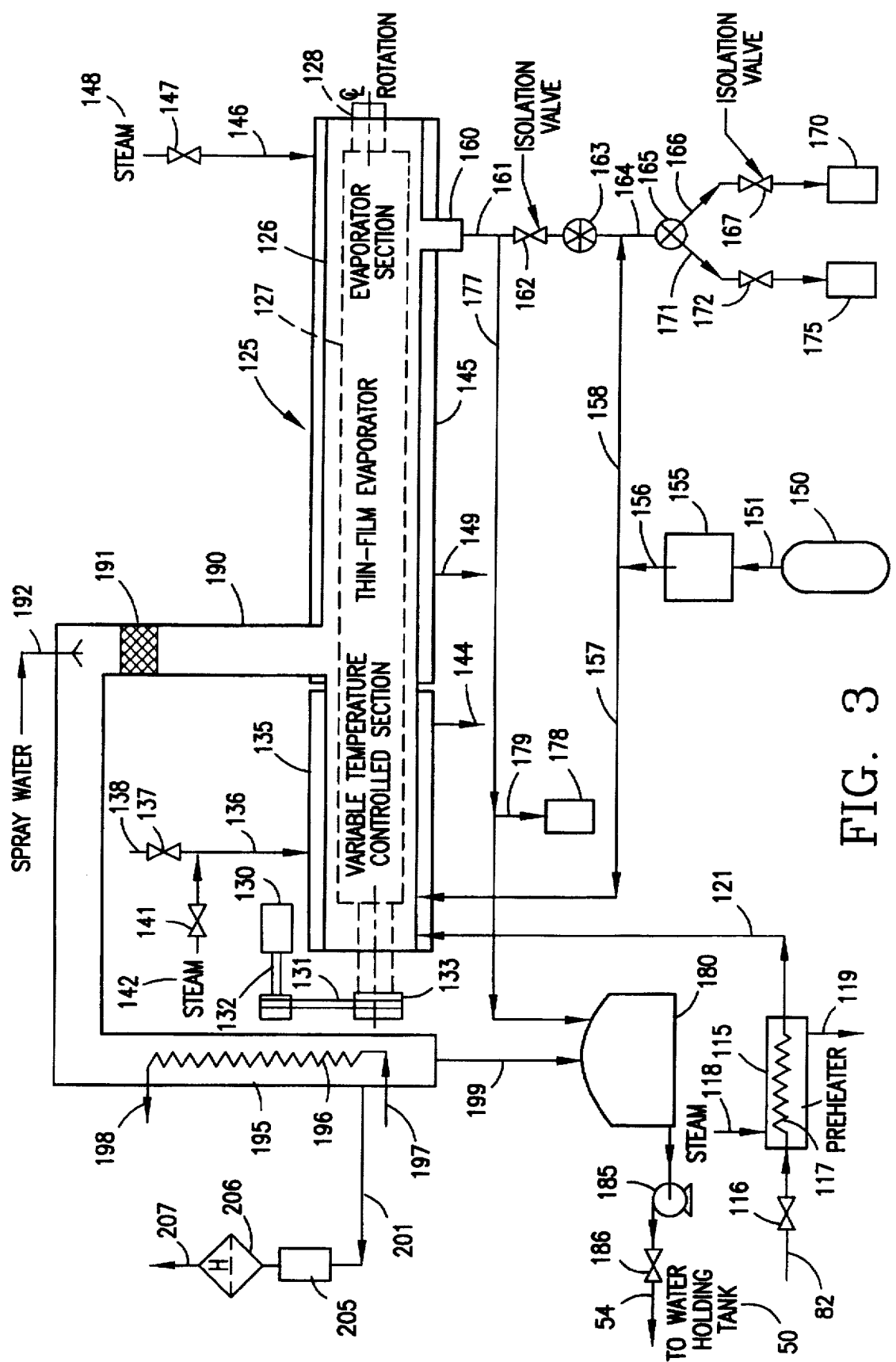
FIG. 3 is a carbonate process flow diagram showing the conversion of the caustic produced in the process of FIG. 1 into the associated carbonate which may be disposed of as a low level radioactive waste.

Referring to FIG. 3, caustic from the storage tank 75 or recycled from the cooling tank 70 via line 68 enters the carbonate process through line 82 to a caustic preheater 115 via valve 116. The preheater 115 consists of a shell and tube heat exchanger in which the caustic is on the tube side 117 and steam entering through line 118 and exiting through a condensate outlet 119 is on the shell side. The caustic preferably is heated to a temperature in the range of from about 60° F. to about 290° F., and for a 50% NaOH solution is preferably heated to about 200° F., but in any event, is at a temperature below the boiling point of the aqueous caustic being introduced into the thin film evaporator 125. The heated caustic exits the preheater 115 through a line 121 and is introduced into the thin film evaporator 125. The thin film evaporator 125 consists of an elongated conduit or tube 126 through which extends an auger 127 having a shaft 128 journalled for rotation about the central axis of the auger, which rotation is provided by a motor 130 connected via its output shaft 132 and pulley 131 to an end 133 of the auger 127.

The thin film evaporator 125 has a cooler portion and a hotter portion, the cooler portion is indicated by the steam/cooling water jacket 135 at the inlet end of the thin film evaporator 125. The steam/cooling water jacket 135 is provided with an inlet line 136 connected to a valve 137 which is connected in turn to a source of cooling water 138. Steam is provided to the steam/cooling water jacket 135 through line 136 by an inlet steam line 142 connect to a valve 141. A condensate outlet 144 removes condensate or water from the cooling jacket 135 and may or may not recirculate to the distillate holding tank 180 or the water holding tank 50. The hotter portion or the evaporator section of the thin film evaporator 125 is provided by a steam jacket 145 having an inlet line 146 connected to a valve 147 which controls the flow of steam from a source 148 thereof to the hotter (evaporator) portion of the thin film evaporator 125. Condensate from the steam jacket 145 is vented therefrom through a condensate outlet line 149 which may be directed as is condensate from line 144.

A liquid carbon dioxide storage tank 150 provides a source of carbon dioxide for the reaction with the caustic heretofore set forth. The carbon dioxide liquid storage tank 150 is connected via line 151 to a vaporizer unit 155, the outlet of which 156 is connected to a line 157 which leads to the thin film evaporator 125. Another portion of that $CO_2$ vapor travels through line 158 which leads to part of the process hereinafter set forth.

A sodium carbonate outlet 160 extends from the evaporator or hotter portion of the thin film evaporator 125 and is connected to a line 161 which leads to a valve 162 used to isolate sodium carbonate when it is produced as a solid from the system. A sight glass 163 downstream of the valve 162 provides for visual inspection of the product which exits the sight glass through line 164 which leads to a diverter 165. The diverter 165 simply divides product between a line 166 which leads through a valve 167 to the waste drum 170. Similarly, the diverter may send product through a line 171 and a valve 172 to the sodium carbonate waste drum 175.

A take off line 177 from the outlet 160 and line 161 therefrom can lead to either a storage drum 178 via cut-off line 179 or to the distillate holding tank 180. This circuit can be used to steam clean the thin film evaporator 125 by closing valve 162. Condensate or water present in the line 177 can then be recirculated from the distillate holding tank 180 via a pump 185 of valve 186 through the line 54 and back to the water holding tank 50 in the caustic process previously described.

Similarly, the line 158 is such that carbon dioxide in the vapor form can be supplied to the line 164 in the event that there is some indication that the reaction of the caustic is incomplete.

Steam generated during the reaction of caustic and carbon dioxide exits the thin film evaporator 125 along with any unreacted carbon dioxide through a vapor outlet 190 located in the evaporator section or hotter portion of the thin film evaporator 125 but near the cooler portion 135. A metal mesh demister 191 is positioned in the vapor outlet 190 intermediate a water spray inlet 192 will be vaporized in the evaporator portion of the thin film evaporator 125 and recycle through outlet 190. The outlet 190 has a condenser portion or leg 195 in which a condensing coil 196 is positioned, the coil 196 being connected to a cooling water inlet 197 and a cooling water outlet 198. Water vapor in the condenser portion 195 is cooled and falls out through a line 199 and is collected in the distillate holding tank 180 for eventual return to the water holding tank 50 and the caustic process. Gases coming out of the condenser portion 195 of the outlet 190 are transferred via a line 201 to a scrubber tank 205 which leads to a HEPA filter 206 and then to a vent line 207 to the atmosphere.

Preferably, the cooler portion of the thin film evaporator is operated at a temperature in the range of from about 60° F. to 290° F. and is preferably maintained at a temperature of around 200° F. if the caustic is introduced as a 50 weight percent sodium hydroxide solution. 60° F. is the freezing point and 290° F. is the boiling point of a 50 wt % NaOH solution. Generally, the temperature should be below the boiling point of the caustic introduced into the thin film evaporator 125. The hotter portion of the thin film evaporator preferably does not exceed about 350° F. The clearance between the auger 127 and the inside of wall of the thin film evaporator conduit or tube 126 is generally less than about 1/8 inch and is preferred to be between 1/16 and 1/8 of an inch. The auger 127 is preferably rotated at about 400 rpm to transport the formed and dried sodium carbonated from the input end to the output end of the evaporator 125.

While there has been described a process in which the caustic solution is transferred to the carbonate production facility, the carbonate production facility is useful for treating hydroxide solutions containing hazardous constituents other than those produced in a fast breeder reactor of the type previously discussed. For instance, toxic metals such as Sb, As, Ba, Be, Cd, Cr, Pb, Hg, Ni, Se, Ag and Tl may be treated in the carbonate process of the present invention provided that the toxic metals are converted to the corresponding hydroxide or hydroxide complexes which can then be introduced into the carbonate process through the line 121 as previously discussed. The process is useful to convert the various toxic metals listed above either as alloys, individual elemental metals or as mixtures of various metallic compounds into the associated carbonate which may be stored in landfills.

Accordingly, it can be seen that there has been provided a process and apparatus for converting radioactive alkali metals as well as other toxic metals into less hazardous materials and more particularly, into the corresponding carbonates which may be handled more safely and ina cheaper manner. The process is advantageous because the carbonates are produced without venting hazardous material to the atmosphere and is environmentally preferred.

While there has been disclosed what is considered to be the preferred embodiment of the present invention it is understood that various changes in the details may be made without departing from the spirit or sacrificing any of the advantages of the present invention.

The embodiments of the invention in which an exclusive property or privilege is claimed are defined as follows:

1. A method of converting radioactive alkali metal into a low level disposable solid waste material, comprising atomizing the radioactive alkali metal and introducing the atomized radioactive alkali metal into an aqueous caustic solution having caustic present in the range of from about 20 wt % to about 70 wt % to convert the radioactive alkali metal to a radioactive alkali metal hydroxide, introducing the aqueous caustic containing radioactive alkali metal hydroxide and $CO_2$ into a thin film evaporator with the $CO_2$ present in an amount greater than required to convert the alkali metal hydroxide to a radioactive alkali metal carbonate, and collecting the radioactive alkali metal carbonate from the thin film evaporator as a dry powder.

2. The method of claim 1, wherein the radioactive alkali metal is Na.

3. The method of claim 1, wherein the radioactive alkali metal is NaK.

4. The method of claim 1, wherein the radioactive alkali metal is the eutectic of NaK.

5. The method of claim 1, wherein the caustic is present in an amount not less than about 50% by weight in the aqueous caustic solution.

6. The method of claim 1, wherein aqueous caustic containing radioactive alkali metal hydroxide is introduced into the thin film evaporator at a temperature below the boiling point of the aqueous caustic.

7. The method of claim 6, wherein the temperature is in the range of from 60° F. to 290° F.

8. The method of claim 7, wherein the radioactive alkali metal hydroxide is NaOH and the temperature is about 200° F.

9. The method of claim 1, wherein the thin film evaporator is a heated conduit having an auger therein with the clearance between the auger and the inside of the conduit being less than about ⅛ inch.

10. The method of claim 9, wherein the conduit is maintained at a temperature of not greater than about 350° F. to dry the alkali metal carbonate after formation thereof.

11. The method of claim 10, wherein the alkali metal is atomized by passing the alkali metal through a concentric nozzle to mix with an atomizing gas.

12. The method of claim 11, wherein the atomizing gas is a mixture of steam and nitrogen.

13. A method of converting radioactive alkali metal into a low level disposable solid waste material, comprising atomizing the radioactive alkali metal and introducing the atomized radioactive alkali metal into an aqueous caustic solution having caustic present in the range of from about 20 wt % to about 70 wt % to convert the radioactive alkali metal to a radioactive alkali metal hydroxide and to produce hydrogen gas, treating the hydrogen gas to remove radioactive particulates, introducing the aqueous caustic containing radioactive alkali metal hydroxide and $CO_2$ into a thin film evaporator with the $CO_2$ present in an amount greater than required to convert the alkali metal hydroxide to a radioactive alkali metal carbonate, the thin film evaporator having a cooler portion where the aqueous caustic and $CO_2$ are introduced and a hotter portion where the carbonate is dried, collecting the radioactive alkali metal carbonate from the hotter portion of the thin film evaporator as a dry powder, removing off gases from the evaporator, and transporting the off gases for recycle or disposal.

14. The method of claim 13, wherein the treated hydrogen gas is vented to the atmosphere.

15. The method of claim 14, wherein the thin film evaporator is a conduit having an auger disposed therein, the aqueous caustic being introduced into the evaporator at a temperature in the range of from about 60° F. to about 290° F., the cooler portion of the evaporator being maintained at a temperature less than above the boiling point of water and the hotter portion of the evaporator being maintained at a temperature not greater than about 350° F.

16. The method of claim 15, wherein the cooler portion of the evaporator is maintained at a temperature of about 200° F.

17. The method of claim 16, wherein the temperature of the aqueous caustic introduced into the evaporator is about 200° F.

18. The method of claim 17, wherein vapor is produced during the conversion of the aqueous caustic to carbonate, the vapor being removed from the evaporator downstream from the cooler portion.

19. The method of claim 17, wherein the clearance between the auger and the inside of the conduit is between about 1/16 inch and ⅛ inch.

* * * * *